United States Patent
Ji et al.

(10) Patent No.: US 10,958,493 B2
(45) Date of Patent: *Mar. 23, 2021

(54) METHOD AND APPARATUS FOR TRANSMITTING AND RECEIVING TIME DIVISION DUPLEX FRAME CONFIGURATION INFORMATION IN WIRELESS COMMUNICATION SYSTEM

(71) Applicant: Samsung Electronics Co., Ltd., Suwon-si (KR)

(72) Inventors: Hyoungju Ji, Seoul (KR); Younsun Kim, Seongnam-si (KR); Youngbum Kim, Seoul (KR); Joonyoung Cho, Suwon-si (KR); Seunghoon Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/869,884

(22) Filed: May 8, 2020

(65) Prior Publication Data

US 2020/0267035 A1 Aug. 20, 2020

Related U.S. Application Data

(63) Continuation of application No. 16/033,792, filed on Jul. 12, 2018, now Pat. No. 10,652,060, which is a
(Continued)

(30) Foreign Application Priority Data

Jun. 20, 2011 (KR) ........................ 10-2011-0059727
May 9, 2012 (KR) ........................ 10-2012-0049056

(51) Int. Cl.
*H04L 27/26* (2006.01)
*H04B 7/26* (2006.01)
(Continued)

(52) U.S. Cl.
CPC ....... *H04L 27/2602* (2013.01); *H04B 7/2656* (2013.01); *H04L 1/0061* (2013.01); *H04L 5/1469* (2013.01); *H04W 72/042* (2013.01)

(58) Field of Classification Search
CPC . H04B 7/2656; H04L 1/0061; H04L 27/2602; H04L 5/1469; H04W 72/042;
(Continued)

(56) References Cited

U.S. PATENT DOCUMENTS 6,597,668 B1 7/2003 Schafer et al.
8,134,976 B2 3/2012 Wallace et al.
(Continued)

FOREIGN PATENT DOCUMENTS

EP 2271163 A1 1/2011
EP 2 288 220 A2 2/2011
(Continued)

OTHER PUBLICATIONS

W. Lei, et al., "Heterogeneous network in LTE-advanced system," 2010 IEEE International Conference on Communication Systems (ICCS), Nov. 17-19, 2010, pp. 156-160.
(Continued)

*Primary Examiner* — Timothy X Pham
(74) *Attorney, Agent, or Firm* — Jefferson IP Law, LLP

(57) ABSTRACT

A method and an apparatus for transmitting and receiving Time Division Duplex (TDD) frame configuration information are disclosed. The base station transmits TDD frame configuration information as system information to a user equipment through a common control channel so as to dynamically change the TDD frame configuration according to uplink and downlink traffic conditions. The base station may deliver the same system information to all user equipments in the cell, removing ambiguity in User Equipment (UE) operations and avoiding interference. In comparison to
(Continued)

an existing method of delivering TDD frame configuration information through system information update, the disclosed method enables user equipments to rapidly cope with traffic changes. In addition, user equipments may receive and apply TDD frame configuration information at the same time.

20 Claims, 12 Drawing Sheets

Related U.S. Application Data continuation of application No. 15/255,922, filed on Sep. 2, 2016, now Pat. No. 10,038,582, which is a continuation of application No. 13/528,063, filed on Jun. 20, 2012, now Pat. No. 9,438,334.

(51) Int. Cl.
*H04L 1/00* (2006.01)
*H04L 5/14* (2006.01)
*H04W 72/04* (2009.01)

(58) Field of Classification Search
CPC ......... H04W 72/1278; H04W 72/0413; H04W 72/1289; H04W 88/02; H04W 72/005; H04W 72/0406; H04W 72/044; H04W 74/04; H04W 84/045; H04W 74/0866
See application file for complete search history.

(56) References Cited

U.S. PATENT DOCUMENTS

| | | |
|---|---|---|
| 2008/0123569 A1 | 5/2008 | Doss et al. |
| 2009/0010185 A1 | 1/2009 | Li et al. |
| 2010/0027446 A1 | 2/2010 | Choi et al. |
| 2010/0232373 A1 | 9/2010 | Nory et al. |
| 2010/0323709 A1 | 12/2010 | Nam et al. |
| 2011/0026444 A1 | 2/2011 | Dai et al. |
| 2011/0045837 A1 | 2/2011 | Kim et al. |
| 2011/0080896 A1 | 4/2011 | Krishnamurthy et al. |
| 2011/0188443 A1 | 8/2011 | Bahceci et al. |
| 2011/0211503 A1 | 9/2011 | Che et al. |
| 2012/0120882 A1 | 5/2012 | Luo et al. |
| 2012/0155338 A1 | 6/2012 | Noh et al. |
| 2012/0218882 A1 | 8/2012 | Ko et al. |
| 2012/0257513 A1* | 10/2012 | Yamada ................ H04L 1/1861 370/248 |
| 2013/0016672 A1* | 1/2013 | Yang .................... H04W 72/042 370/329 |
| 2013/0058240 A1 | 3/2013 | Kim et al. |
| 2013/0058294 A1 | 3/2013 | Miki et al. |
| 2013/0102320 A1 | 4/2013 | Suzuki et al. |
| 2013/0155990 A1* | 6/2013 | Nishio .................. H04L 5/0032 370/329 |
| 2013/0336177 A1 | 12/2013 | Gao et al. |
| 2014/0044072 A1 | 2/2014 | Piggin et al. |
| 2014/0112280 A1 | 4/2014 | Lee et al. |
| 2014/0226593 A1* | 8/2014 | Han ...................... H04W 72/02 370/329 |
| 2017/0026944 A1 | 1/2017 | Li et al. |

FOREIGN PATENT DOCUMENTS

| | | |
|---|---|---|
| EP | 2 501 071 A2 | 9/2012 |
| JP | 2010-002555 A | 8/2010 |
| KR | 10-2011-0051156 A | 5/2011 |
| WO | 02/01315 A2 | 1/2002 |
| WO | 2009/152737 A1 | 12/2009 |
| WO | 2010-049587 A1 | 5/2010 |
| WO | 2010/147435 A2 | 12/2010 |
| WO | 2011/034317 A2 | 3/2011 |
| WO | 2011/034966 A1 | 3/2011 |
| WO | 2011056043 A2 | 5/2011 |

OTHER PUBLICATIONS

Indian Office Action dated Nov. 13, 2019, issued in Indian Patent Application No. 3751/KOLNP/2013.
Fujitsu, DCI formats which can include carrier indicator field, 3GPP TSG-RAN1 #59bis, R1-100724, Jan. 18-22 J01Q, Valencia, Spain.
Alcatel-Lucent Shanghai Bell et al., DCI Format Design for LTE-A PUSCH Transmission, 3GPP TSG RAN NG1 Meeting #59bis, R1-100433, Jan. 18-22, 2010, Valencia, Spain.
Korean Office Action dated Jul. 5, 2019, issued in Korean Patent Application No. 10-2012-0049056.
Japanese Office Action dated Nov. 19, 2018; Japanese Patent Application No. 2017-244187.
Korean Office Action dated Jan. 18, 2019; Application No. 10-2012-0049056.

* cited by examiner

METHOD AND APPARATUS FOR TRANSMITTING AND RECEIVING TIME DIVISION DUPLEX FRAME CONFIGURATION INFORMATION IN WIRELESS COMMUNICATION SYSTEM

PRIORITY

This application is a continuation application of prior application Ser. No. 16/033,792, filed on Jul. 12, 2018, which is a continuation application of prior application Ser. No. 15/255,922, filed on Sep. 2, 2016, which has issued as U.S. Pat. No. 10,038,582 on Jul. 31, 2018, which is a continuation application of prior application Ser. No. 13/528,063, filed on Jun. 20, 2012, which has issued as U.S. Pat. No. 9,438,334 on Sep. 6, 2016 and was based on and claimed priority under 35 U.S.C. § 119(a) of a Korean patent application number 10-2011-0059727, filed on Jun. 20, 2011, in the Korean Intellectual Property Office, and of a Korean patent application number 10-2012-0049056, filed on May 9, 2012, in the Korean Intellectual Property Office, the entire disclosure of each of which is hereby incorporated by reference.

BACKGROUND OF THE INVENTION

1. Field of the Invention

The present invention relates to a wireless communication system. More particularly, the present invention relates to a method and an apparatus for transmitting and receiving configuration information on Time Division Duplex (TDD) frames having a dynamic subframe.

2. Description of the Related Art

Orthogonal Frequency Division Multiplexing (OFDM) transmission is a multi-carrier transmission scheme using multiple carriers for data transmission. In OFDM, a serial input symbol stream is divided into multiple parallel streams, which are then mapped to multiple orthogonal sub-carriers. Each sub-carrier is modulated by the corresponding stream with a specified modulation scheme for transmission.

Multi-carrier modulation was first applied to high frequency military radio in the late 1950s. Although OFDM modulation techniques using multiple orthogonal sub-carriers have been developed since the 1970s, practical applications thereof have been limited owing to difficulty of implementing orthogonal modulation between multiple sub-carriers. A significant breakthrough in OFDM applicability was made in 1971 (Weinstein et al.) by applying Discrete Fourier Transform (DFT) and Inverse DFT (IDFT) to OFDM techniques. Use of DFT and IDFT has made OFDM modulation and demodulation feasible. In addition, use of guard intervals and insertion of Cyclic Prefix (CP) symbols in guard intervals have significantly reduced negative impacts of multipath reception and delay spread on the system.

Thanks to such technical advances, OFDM techniques have been applied to various digital transmission schemes, such as Digital Audio Broadcasting (DAB), Digital Video Broadcasting (DVB), Wireless Local Area Networking (WLAN) and Wireless Asynchronous Transfer Mode (WATM). That is, use of OFDM techniques had been limited owing to high hardware complexity in the past, but recent advances in various digital signal processing techniques including Fast Fourier Transform (FFT) and Inverse Fast Fourier Transform (IFFT) have made OFDM implementation practical.

Although similar to existing Frequency Division Multiplexing (FDM), OFDM is highly efficient in high speed transmission by maintaining orthogonality between multiple tones. As OFDM exhibits high frequency efficiency and is robust against multi-path fading, it can achieve optimum transmission efficiency in high speed data transmission.

Further, OFDM exhibits high frequency efficiency as it uses frequency spectra in an overlapping manner, is robust against frequency selective fading and multi-path fading, can reduce Inter-Symbol Interference (ISI) using a guard interval, can be implemented with an equalizer having a simple hardware structure, and is robust against impulse noise. With these advantages, OFDM is actively utilized for structuring communication systems.

In wireless communication, adverse channel conditions may hinder high quality data services. Channel conditions in wireless communication may frequently change owing to Additive White Gaussian Noise (AWGN), changes in received signal power due to fading, shadowing, Doppler effects due to movement and speed changes of a user equipment, and interference caused by other users and multi-path signals. Hence, effectively coping with such adverse channel conditions may be needed to support high speed and high quality data services in wireless communication.

In OFDM, modulation signals are on a two dimensional time-frequency resource grid. Resources in the time domain are distinguished by different orthogonal OFDM symbols. Resources in the frequency domain are distinguished by different orthogonal tones. That is, in the time-frequency resource grid, one OFDM symbol on the time axis and one tone on the frequency axis can specify a minimum resource unit that is referred to as a Resource Element (RE). As different resource elements are orthogonal to each other even after passing through frequency selective channels, signals sent through different resource elements can be received at the receiver side without causing interference therebetween.

A physical channel is a channel on the physical layer that is used to transmit modulation symbols obtained by modulating one or more coded bit streams. In an Orthogonal Frequency Division Multiple Access (OFDMA) system, multiple physical channels are created according to usage of information streams to be transmitted or types of receivers. The transmitter and receiver have to make a prior agreement on how to arrange a physical channel on what resource elements (mapping rule).

A wireless communication system may operate in a Frequency Division Duplex (FDD) mode or a TDD mode. In the FDD mode, two different frequencies are used for uplink and downlink transmission, and the base station and user equipment may send and receive data at the same time. In the TDD mode, the same frequency is used for uplink and downlink transmission, and the base station and user equipment cannot send and receive data at the same time. Hence, in the TDD mode, the base station and user equipment have to make a prior agreement on the time for transmission.

Therefore, a need exists for a method and an apparatus for transmitting and receiving TDD frame configuration information in a wireless communication system, wherein the base station sends TDD frame configuration information through a pre-specified region of the common control channel to thereby dynamically change the TDD frame configuration.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method and an apparatus for transmitting and receiving Time Division Duplex (TDD) frame configuration information in a wireless communication system, wherein the base station sends TDD frame configuration information through a pre-specified region of the common control channel to thereby dynamically change the TDD frame configuration, so that the base station may adaptively cope with uplink and downlink traffic conditions and interference caused by simultaneous transmission of the base station and user equipment owing to an error in control channel reception of the user equipment may be prevented.

In accordance with an aspect of the present invention, a method of transmitting TDD frame configuration information for a base station in a wireless communication system is provided. The method includes determining a TDD frame configuration by assigning a transmission direction to a dynamic subframe in a TDD frame, generating system information based on information on the TDD frame configuration, and transmitting the system information by inserting the system information into a common control channel.

The generating of the system information may include making the size of the system information equal to that of Downlink Control Information (DCI) for the common control channel. The generating of the system information may also include attaching a Cyclic Redundancy Check (CRC) sequence scrambled with a Radio Network Temporary Identifier (RNTI) defined for TDD frame configuration information to the system information. The generating of the system information may further include aggregating individual TDD frame configuration information of multiple carriers used in the wireless communication system into the system information.

In accordance with another aspect of the present invention, a method of receiving TDD frame configuration information for a user equipment in a wireless communication system is provided. The method includes receiving system information on a common control channel, identifying a TDD frame configuration indicating a transmission direction of a dynamic subframe in a TDD frame by analyzing the system information, and utilizing the dynamic subframe according to the transmission direction thereof.

The system information may have a size equal to that of DCI for the common control channel. Receiving system information may include conducting blind decoding of the common control channel with an RNTI defined for TDD frame configuration information. The system information may be system information created by aggregating individual TDD frame configuration information of multiple carriers used in the wireless communication system.

In accordance with another aspect of the present invention, an apparatus for transmitting TDD frame configuration information in a base station of a wireless communication system is provided. The apparatus includes a controller for determining a TDD frame configuration by assigning a transmission direction to a dynamic subframe in a TDD frame, a system information generator for generating system information based on information on the TDD frame configuration, and a control channel generator for inserting the system information into a common control channel for transmission.

The system information generator may make the size of the system information equal to that of DCI for the common control channel. The system information generator may attach a CRC sequence scrambled with an RNTI defined for TDD frame configuration information to the system information. The system information generator may aggregate individual TDD frame configuration information of multiple carriers used in the wireless communication system into the system information.

In accordance with another aspect of the present invention, an apparatus for receiving TDD frame configuration information in a user equipment of a wireless communication system is provided. The apparatus includes a control channel receiver for receiving system information on a common control channel, a system information analyzer for identifying a TDD frame configuration indicating a transmission direction of a dynamic subframe in a TDD frame by analyzing the system information, and a controller for utilizing the dynamic subframe according to the transmission direction thereof.

The system information may have a size equal to that of DCI for the common control channel. The control channel receiver may include a blind decoder that conducts blind decoding of the common control channel with an RNTI defined for TDD frame configuration information. When multiple carriers are used in the wireless communication system, the system information may be created by aggregating individual TDD frame configuration information of the multiple carriers.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
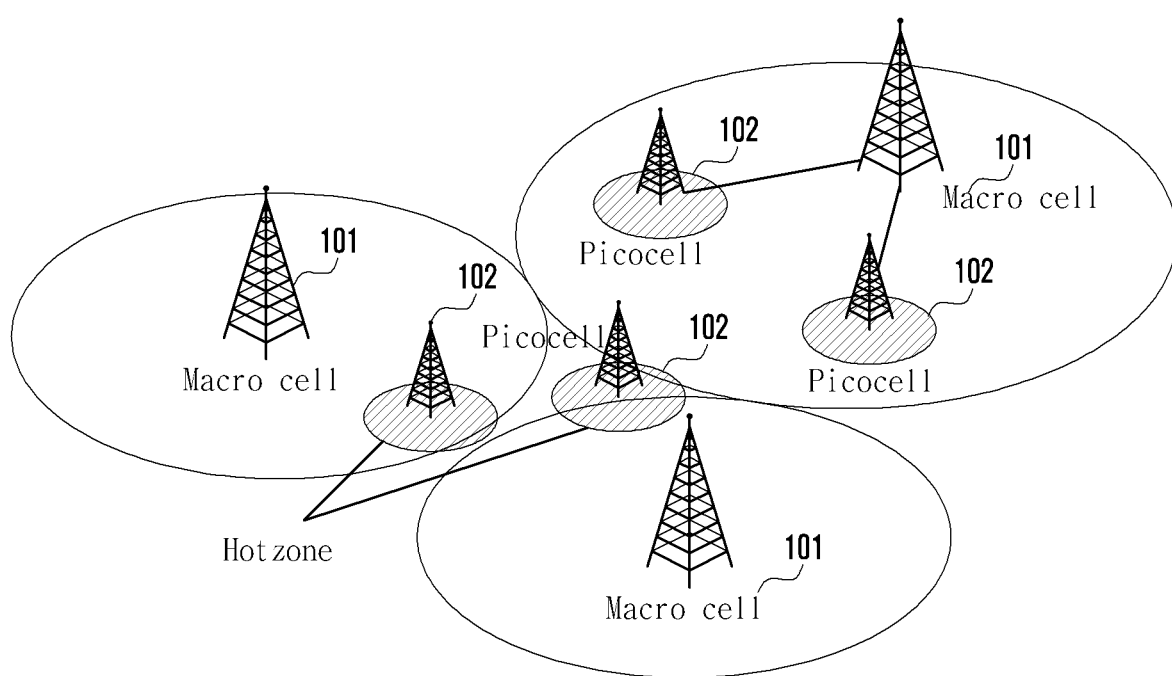
FIG. 1 illustrates an overview of a wireless communication system according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

FIGS. 1 through 12, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly stated otherwise. A set is defined as a non-empty set including at least one element.

The following description is focused on Long Term Evolution (LTE) and LTE-Advanced (LTE-A) systems operating in a Time Division Duplex (TDD) mode. However, exemplary embodiments of the present invention are also applicable to other wireless communication systems supporting base station scheduling and TDD mode operation without significant modification.

In the LTE system, Orthogonal Frequency Division Multiplexing (OFDM) is applied to downlink and Single Carrier-Frequency Division Multiple Access (SC-FDMA) is applied to uplink. The LTE system may operate in a Frequency Division Duplex (FDD) mode or a TDD mode. During the FDD mode, two frequency bands are used respectively for uplink transmission and downlink transmission. During the TDD mode, one frequency band is used alternately for uplink transmission in one time period and downlink transmission in another time period according to a preset rule. In LTE TDD mode, radio frames may have seven uplink/downlink configurations. Once the TDD frame configuration is determined in the system, it is rarely changed. To avoid severe interference between uplink transmission and downlink transmission among cells, neighboring cells should have the same TDD frame configuration for synchronization.

In TDD and FDD modes, one subframe is 1 ms long in time and LTE transmission bandwidth wide in frequency, and includes two slots in time. In the frequency domain, subcarriers (i.e., tones) are grouped into Resource Blocks (RBs), which are used as a basic unit for resource allocation. One resource block may include 12 tones in frequency and 14 OFDM symbols in time (slot). Each subframe includes a control channel region for control channel transmission and a data channel region for data channel transmission, and Reference Signals (RSs) for channel estimation are inserted into the control and data channel regions.

Recently, research and development has been conducted on the LTE-A system as an evolved version of the LTE system. In TDD mode of the LTE-A system, similarly to the case of the LTE system, once the TDD frame configuration is determined, it cannot be readily changed, resulting in the inability to dynamically cope with changes in data traffic. That is, although uplink data traffic significantly increases for a certain time, unused downlink subframes are not usable for transmitting increased uplink traffic. Such a problem tends to occur in the presence of a hierarchy of cells. This is further described with reference to FIG. 1.

FIG. 1 illustrates an overview of a wireless communication system according to an exemplary embodiment of the present invention. In the wireless communication system, macro cells and picocells are hierarchically arranged in the same area.

Referring to FIG. 1, reference numerals 101 and 102 indicate a macro cell and a picocell, respectively. A picocell is typically installed at an area where data traffic demand is high within the coverage area of a macro cell. In the picocell, lower transmit power is used than in the macro cell. Even in the same area, data traffic demand may dynamically change with time. For example, when many users request data reception and Voice over IP (VoIP) reception and transmission, downlink traffic demand is high and uplink traffic demand is low. The system then selects a TDD frame configuration that allocates a large number of subframes to downlink and allocates a small number of subframes to uplink. At a later time, when many users request data transmission and VoIP transmission, there is a rapid increase in uplink resource demand. It is difficult to handle such a situation with normal system configurations.

Figure 2:
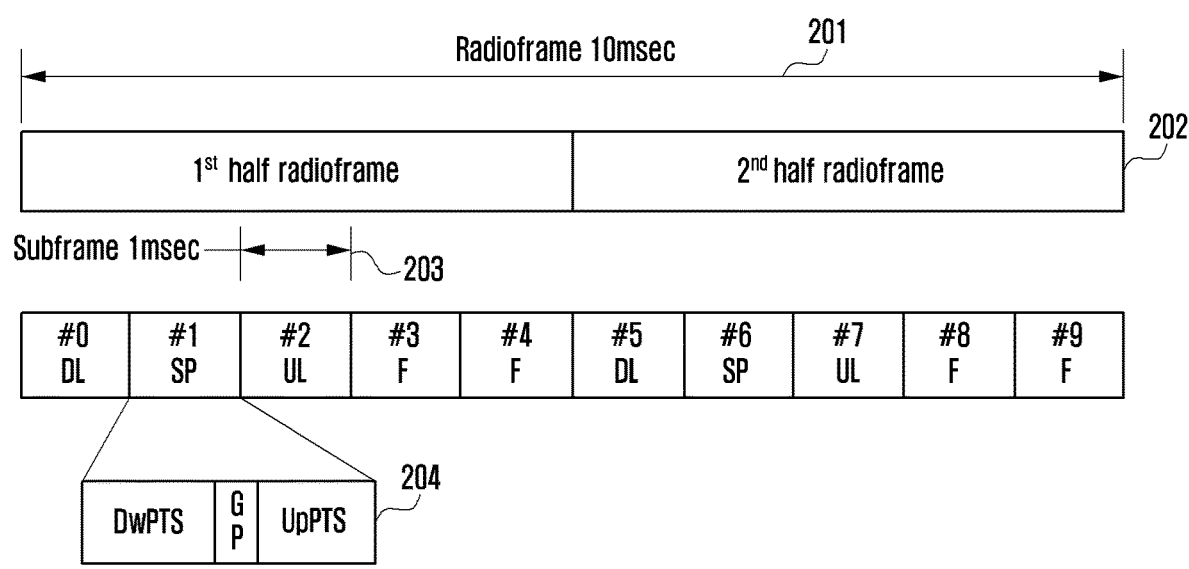
FIG. 2 illustrates a Time Division Duplex (TDD) frame structure according to an exemplary embodiment of the present invention.

FIG. 2 illustrates a TDD frame structure according to an exemplary embodiment of the present invention.

Referring to FIG. 2, in an LTE system, one TDD radio frame 201 having a length of 10 ms includes two half frames 202. Each half frame 202 is composed of five subframes 203. Hence, a TDD radio frame 201 has ten subframes 203, and each subframe 203 is 1 ms long. In the LTE system, as illustrated in Table 1 below, a TDD radio frame may have one of seven configurations according to the number of subframes allocated to downlink and uplink.

In Table 1, 'D' indicates a subframe allocated to downlink, 'U' indicates a subframe allocated to uplink, and 'S' indicates a special subframe. For example, in configuration 0, subframes 0 and 5 (marked with 'D') are used for downlink transmission, subframes 2, 3, 4, 7, 8 and 9 (marked with 'U') are used for uplink transmission, and subframes 1 and 6 (marked with 'S') are special subframes. As indicated by reference numeral 204, a special subframe consists of three fields: DwPTS, Guard Period (GP) and UpPTS. The DwPTS field is used for downlink transmission, the GP field is not used for transmission, and the UpPTS field is used for uplink transmission. In a special subframe, as the UpPTS field is small, it is used only for transmitting the Physical Random Access Channel (PRACH) and Sounding Reference Signal (SRS) and is not used for data or control channel transmission. The GP field is used to assure a guard time used for switching from downlink transmission to uplink transmission.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, some subframes are always used for the same purpose regardless of configuration. For example, subframes 0, 1, 2, 5, 6 and 7 do not change in the 'D', 'S' or 'U' markings for all configurations. Other subframes may change in the 'D', 'S' or 'U' markings according to configuration. In a typical LTE system, once the TDD frame configuration is determined, it does not readily change according to changes in data traffic. It may require at least 80 ms to change the TDD frame configuration in defiance of interference with neighboring cells. This time of 80 ms is a time that is needed by the user equipment to receive system update information sent by the base station and to update the system information without any reception error. In reality, it may take 100 ms to several seconds to change the TDD frame configuration. Hence, a scheme to dynamically change the TDD frame configuration may need to be developed. In a TDD frame, subframes that may dynamically change in downlink/uplink assignment (i.e., dynamic subframes) are subframes 3, 4, 8 and 9, or subframes 3 and 4.

To switch transmission direction at a specific subframe, the user equipment is to be notified of transmission direction at the subframe at a preset point in time. For downlink transmission, downlink scheduling information is effective for the same subframe at which it is transmitted. Hence, downlink scheduling information indicating that a given subframe is used for downlink transmission may be transmitted at the given subframe. For uplink transmission, received uplink scheduling information applies to uplink transmission at least four subframes later. Hence, uplink scheduling information indicating that a given subframe is used for uplink transmission should be transmitted at least four subframes before the given subframe. Hence, transmission direction switching may be accomplished by specifying a control channel carrying scheduling information and a subframe to which the scheduling information is to be applied.

However, subframe direction switching through scheduling may cause a problem. An unscheduled user equipment may repeatedly attempt control channel decoding at each downlink subframe even when a control channel assigned to the user equipment is not present. This may cause a channel decoding error, which may result in simultaneous transmission by the base station and user equipment at the same time. Consequently, communication performance of the base station and user equipment may be degraded.

In an exemplary embodiment of the present invention, TDD frame configuration information indicating subframe directions is sent as part of system information transmitted on the control channel, so that every user equipment may be readily aware of subframe direction switching. This contributes to prevention of link interference and facilitates rapid system configuration change.

Figure 3:
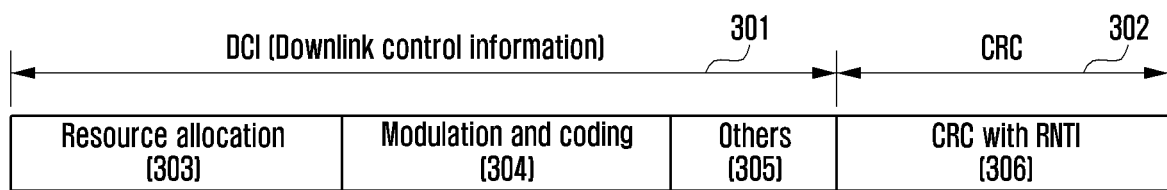
FIG. 3 illustrates a format of generic control channel information according to an exemplary embodiment of the present invention.

FIG. 3 illustrates a format of generic control channel information according to an exemplary embodiment of the present invention.

In general, control channels have the same basic structure regardless of common control channels and User Equipment (UE)-specific control channels. Referring to FIG. 3, the control channel information includes a Downlink Control Information (DCI) part 301 and a Cyclic Redundancy Check (CRC) part 302. Here, the DCI part 301 is a region for actual control channel information, and the CRC part 302 is a region for an error detection sequence. The DCI part 301 includes fields 303, 304 and 305 for resource allocation information, channel coding information, and other information. In the case of a common control channel, any user equipment may receive system information at a data channel region indicated by information contained in the fields 303 and 304. Here, the CRC part 302 contains a CRC value scrambled with a Radio Network Temporary Identifier (RNTI) known to all user equipments, so that any user equipment may receive the control channel information. In the case of a UE-specific control channel, a specific user equipment may receive a data channel indicated by information contained in the fields 303 and 304. Here, the CRC part 302 contains a CRC value scrambled with an RNTI known only to a particular user equipment, so that only the user equipment may receive the control channel information. As described above, generic control channel information is transmitted regardless of common control channels and UE-specific control channels, and is information used to receive a data channel carrying actual information. Hence, to deliver updated TDD configuration information in a generalized way, the base station performs data channel scheduling on the common control channel and user equipments obtain system information through data channel decoding.

Figure 4:
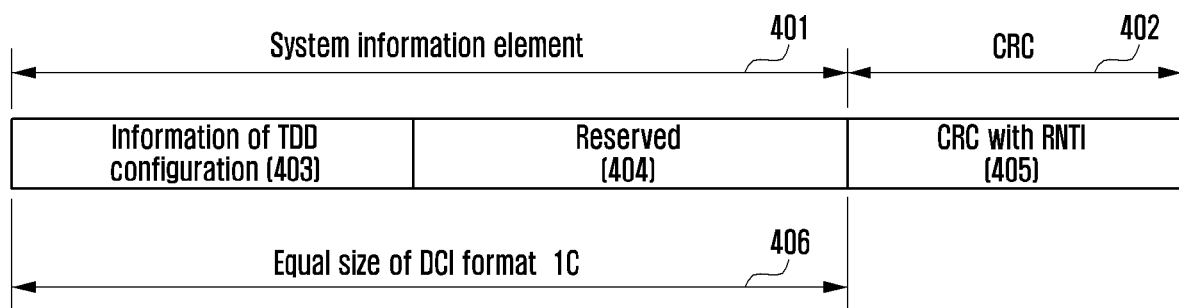
FIG. 4 illustrates a format of control channel information according to an exemplary embodiment of the present invention.

FIG. 4 illustrates a format of control channel information according to an exemplary embodiment of the present invention. Here, system information containing TDD frame configuration information is sent on the common control channel.

Referring to FIG. 4, unlike typical control channel information, actual system information is sent on the control channel information region. The common control channel information includes a system information part 401 and a CRC part 402. The system information part 401 includes a TDD configuration field 403 and a reserved field 404. The size of the system information part 401 is set to that of the DCI part 301. The reserved field 404 is used so that system information in the system information part 401 always has the same size. When the size of the system information part 401 is equal to that of other common control channel information, the user equipment may perform blind decoding of the control channel through CRC checking without too many decoding attempts. As DCI format 1C is used to transmit the common control channel in the LTE system, the size of the system information part 401 is set to the size of DCI format 1C. In the CRC part 402, a new RNTI is used to distinguish the proposed control channel information from other control channel information. Table 2 below illustrates RNTIs used in the LTE system.

TABLE 2

| Value (hexadecimal) | RNTI |
|---|---|
| 0000 | N/A |
| 0001-003C | RA-RNTI, C-RNTI, Semi-Persistent Scheduling C-RNTI, Temporary C-RNTI, Transmit Power Control-Physical Uplink Control Channel (TPC-PUCCH)-RNTI and TPC-Physical Uplink Shared Channel (PUSCH)-RNTI |
| 003D-FFF3 | C-RNTI, Semi-Persistent Scheduling C-RNTI, Temporary C-RNTI, TPC-PUCCH-RNTI and TPC-PUSCH-RNTI |
| FFF4-FFFC | Reserved for future use |
| FFFD | M-RNTI |
| FFFE | P-RNTI |
| FFFF | SI-RNTI |

Referring to Table 2, M-RNTI, P-RNTI and SI-RNTI are used for common control channel transmission using DCI format 1C. In an exemplary embodiment of the present invention, to transmit TDD configuration system information, one of FFF4-FFFC values is assigned to a new TD-RNTI. As shown in Table 3 below, 'FFFC' is assigned to TD-RNTI.

TABLE 3

| Value (hexadecimal) | RNTI |
|---|---|
| 0000 | N/A |
| 0001-003C | RA-RNTI, C-RNTI, Semi-Persistent Scheduling C-RNTI, Temporary C-RNTI, TPC-PUCCH-RNTI and TPC-PUSCH-RNTI |
| 003D-FFF3 | C-RNTI, Semi-Persistent Scheduling C-RNTI, Temporary C-RNTI, TPC-PUCCH-RNTI and TPC-PUSCH-RNTI |
| FFF4-FFFB | Reserved for future use |
| FFFC | TD-RNTI |
| FFFD | M-RNTI |
| FFFE | P-RNTI |
| FFFF | SI-RNTI |

An exemplary embodiment of the present invention relates to both transmission of TDD configuration information and control channels delivering system information directly to user equipments without using data channels.

TDD configuration information in the TDD configuration field 403 notifies user equipments of subframe directions as follows. Table 4 below illustrates an exemplary embodiment using two bits, which indicate directions of subframes 3 and 4 or subframes 8 and 9 (i.e., dynamic subframes described above). For example, information bits '00' may indicate that subframes 3 and 4 or subframes 8 and 9 are used for uplink transmission. The inversed values of the bit patterns defined in Table 4 may also be utilized in the same manner. As one control channel is indicated by a maximum of two subframes, a period of 5 ms or a multiple thereof may be used for TDD mode operation.

TABLE 4

| Information field | Subframe direction |
|---|---|
| 00 | U U |
| 01 | U D |
| 10 | (Reserved) |
| 11 | D D |

Table 5 below indicates subframe direction switching from the uplink to the downlink. In Table 5, configuration/slot means TDD configuration number/slot. For example, 0/1 indicates TDD configuration 0/odd slot, and 0/2 indicates TDD configuration 0/even slot. In Table 5, as the number of uplink subframes differs depending upon TDD configurations, the information field may have different numbers of bits. The user equipment identifies the number of bits based on current configuration information.

TABLE 5

| Configuration (conf/slot) | Information field | Subframe direction |
|---|---|---|
| 0/1, 0/2, 1/2, 3/1, 6/1, 6/2 | 00 | U U |
|  | 01 | U D |
|  | 10 | (Reserved) |
|  | 11 | D D |
| 1/1, 2/2, 4/1 | 0 | U |
|  | 1 | D |
| Else | NA | NA |

Table 6 below indicates subframe direction switching from downlink to uplink. In Table 6, as in Table 5, configuration/slot means TDD configuration number/slot.

TABLE 6

| Configuration (conf/slot) | Information field | Subframe direction |
|---|---|---|
| 2/1, 3/2, 4/2, 5/1, 5/1 | 00 | U U |
|  | 01 | U D |
|  | 10 | (Reserved) |
|  | 11 | D D |
| 1/1, 2/2, 4/1 | 0 | U |
|  | 1 | D |
| 0/1, 0/2, 1/2, 3/1, 6/1, 6/2 | NA | NA |

Table 7 below illustrates a scheme indicating subframe directions using four bits. In the case of using 4 bits, a period of 10 ms or a multiple thereof may be used for TDD mode operation.

TABLE 7

| Information field | Subframe direction |
| --- | --- |
| 0000 | U U U U |
| 0001 | U U U D |
| 0010 | (Reserved) |
| 0011 | U U D D |
| 0100 | U D U U |
| 0101 | U D U D |
| 0110 | (Reserved) |
| 0111 | U D D D |
| 1000-1011 | (Reserved) |
| 1100 | D D U U |
| 1101 | D D U D |
| 1110 | (Reserved) |
| 1111 | D D D D |

When a 4-bit information field as in Table 7 is used two times, a total of 8 bits may be used to indicate directions of eight subframes excluding subframes 0 and 5. In this case, TDD frame reconfiguration may be performed in a period of 10 ms.

Table 8 below illustrates a scheme using three bits to directly indicate TDD configuration indexes instead of indicating subframe directions. In Table 8, the information field indicates one TDD configuration and subframe directions are the same as in Tables 4 through 7.

TABLE 8

| Information field | TDD configuration | Equivalent subframe direction (D0, D1, D2, D3) |
| --- | --- | --- |
| 000 | 0 | U U U U |
| 001 | 1 | U D U D |
| 010 | 2 | D D U D |
| 011 | 3 | U U D D |
| 100 | 4 | U D D D |
| 101 | 5 | D D D D |
| 110 | 6 | U U U U |
| 111 | (Reserved) | — |

Figure 5:
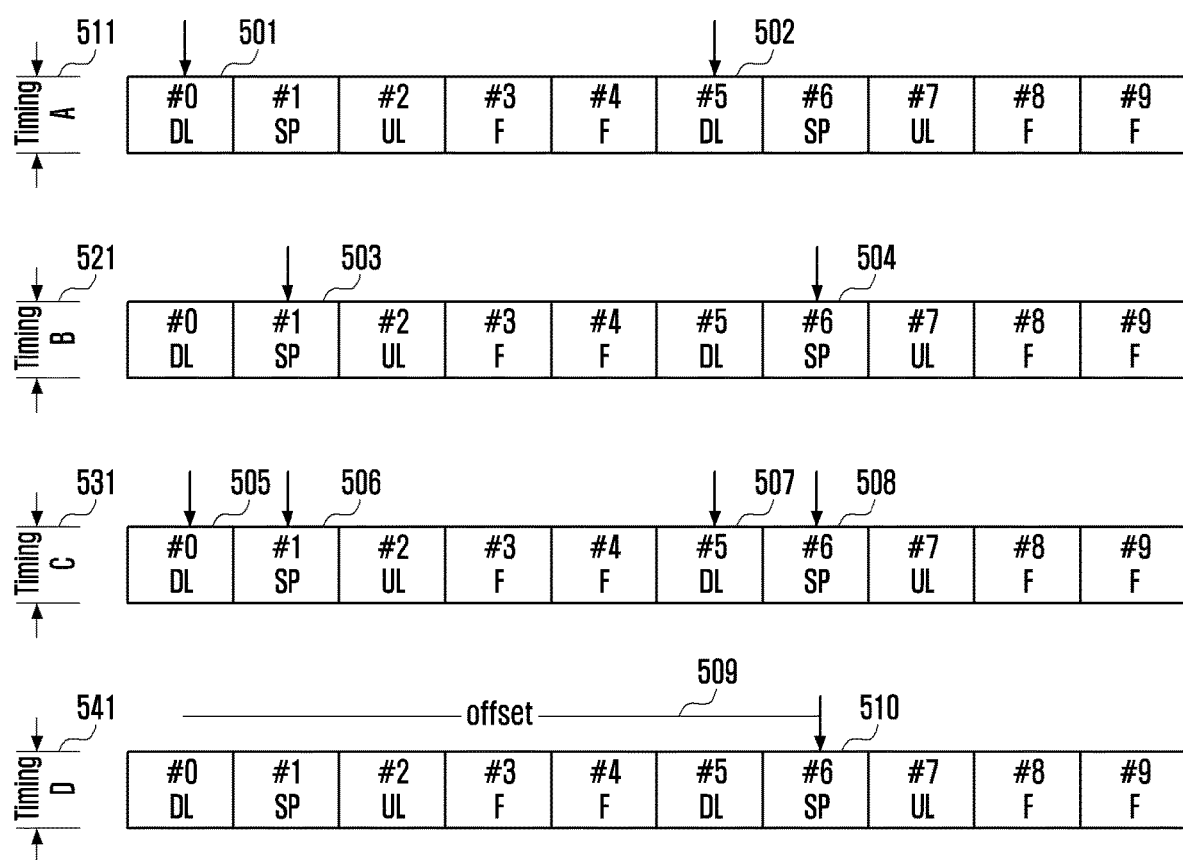
FIG. 5 depicts transmission of TDD frame configuration information according to an exemplary embodiment of the present invention.

FIG. 5 depicts control channel transmission for TDD configuration information according to an exemplary embodiment of the present invention.

Referring to FIG. 5, as directions of subframes 3, 4, 8 and 9 may frequently change according to TDD frame configurations, subframes 3, 4, 8 and 9 are not suitable for common control channel transmission. Among the remaining subframes, subframes 0, 1, 5 and 6 may be used for downlink control channel transmission. In the case of using a period of 5 ms, as indicated by reference numeral 511 of FIG. 5, the user equipment should receive the control channel at subframe 0 indicated by reference numeral 501 and subframe 5 indicated by reference numeral 502. To allow other control channel transmissions using limited common control channel resources, as indicated by reference numeral 521, TDD configuration information may be transmitted at subframe 1 indicated by reference numeral 503 and subframe 6 indicated by reference numeral 504. In an exemplary embodiment of the present invention, as indicated by reference numeral 531, subframes 0, 1, 5 and 6, indicated by reference numerals 505, 506, 507 and 508, respectively, may be pre-specified as candidates and the user equipment is directed to attempt to receive the new control channel at the pre-specified subframes. In another exemplary embodiment of the present invention, a period and offset are provided so that the user equipment is allowed to receive the new control channel only at one of subframes 0, 1, 5 and 6, indicated by reference numerals 505, 506, 507 and 508, respectively.

When the period is 10 ms and the offset, indicated by reference numeral 509, is 3, as indicated by reference numeral 541, TDD configuration information may be transmitted at subframe 6 indicated by reference numeral 510 among the four available subframes.

Figure 6:
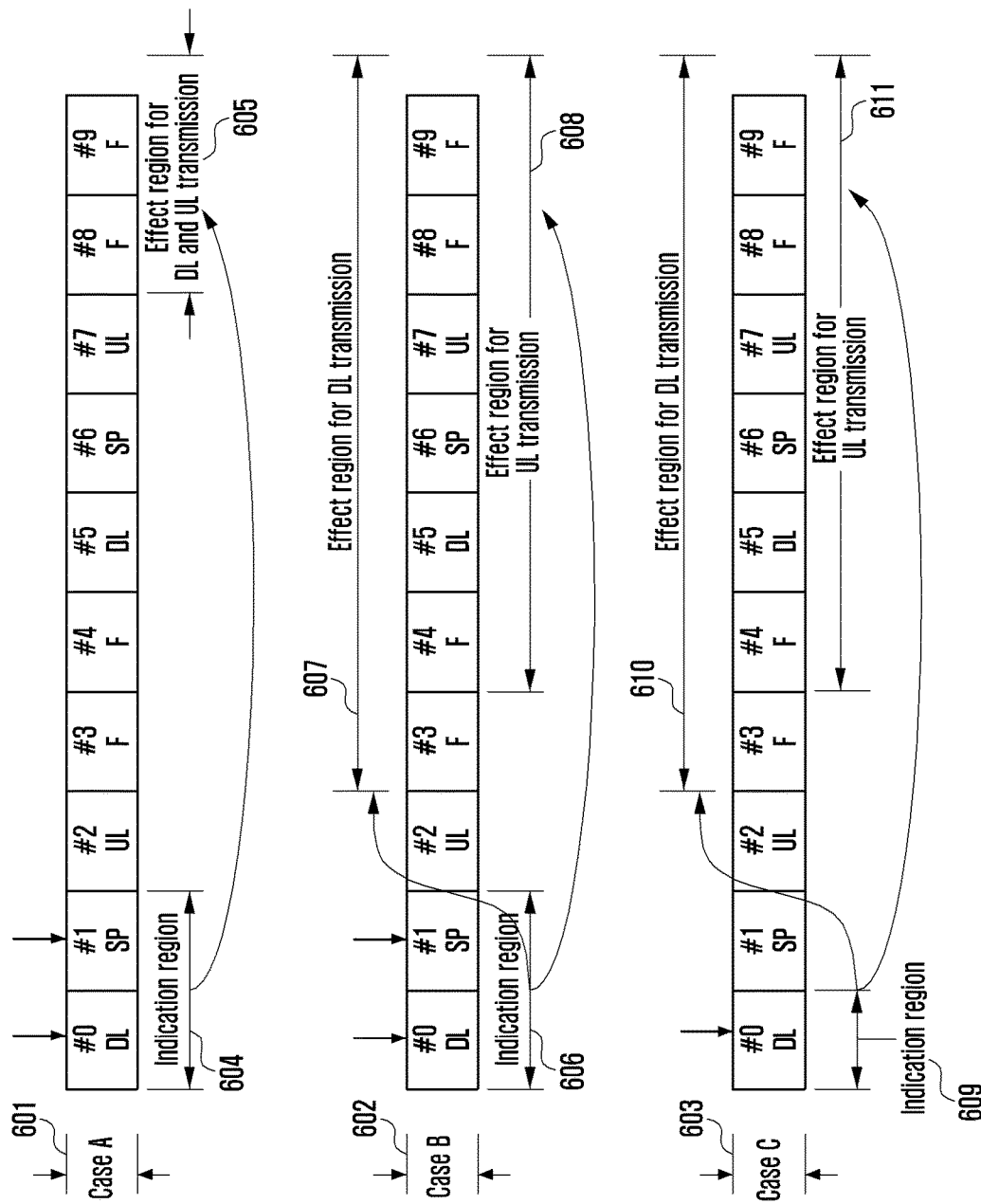
FIG. 6 illustrates timing relationships between reception and application of TDD frame configuration information according to an exemplary embodiment of the present invention.

FIG. 6 illustrates timing relationships between reception and application of TDD frame configuration information according to an exemplary embodiment of the present invention.

Referring to FIG. 6, as indicated by reference numeral 601, when a direction switch indication is received at subframe 0 or 1, indicated by reference numeral 604, direction switching may be effected at a later time for both downlink and uplink transmission, as indicated by reference numeral 605. This takes into consideration the time required for the user equipment to receive actual scheduling information after reception of the corresponding switch indication. That is, a direction switch indication received at a subframe is effected at a dynamic subframe at least four subframes later.

In another exemplary embodiment of the present invention, as indicated by reference numeral 602, a direction switch indication, indicated by reference numeral 606, may be effected at one slot time later for a downlink subframe, indicated by reference numeral 607, and may be effected at a later time for an uplink subframe, indicated by reference numeral 608. A downlink subframe may be switched to an uplink subframe immediately after the direction switch indication as no scheduling information is needed, and an uplink subframe may be switched to a downlink subframe at least four subframes thereafter as scheduling information is needed. That is, downlink-to-uplink switching is effected at a dynamic subframe next to the subframe at which the corresponding indication is received, and uplink-to-downlink switching is effected at a dynamic subframe at least four subframes later from the subframe at which the corresponding indication is received.

In another exemplary embodiment of the present invention, as indicated by reference numeral 603, when a direction switch indication, indicated by reference numeral 609, is transmitted at subframe 0 or 5, it can be applied to an uplink subframe being the last one in the same half frame while allowing a delay of at least four subframes, as indicated by reference numeral 611. This corresponds to earliest application of the switch indication, as indicated by reference numeral 610. That is, downlink-to-uplink switching is effected from a dynamic subframe within four subframe's time from the subframe at which the corresponding indication is received, and uplink-to-downlink switching is effected from a dynamic subframe at least four subframes later from the subframe at which the corresponding indication is received.

Figure 7:
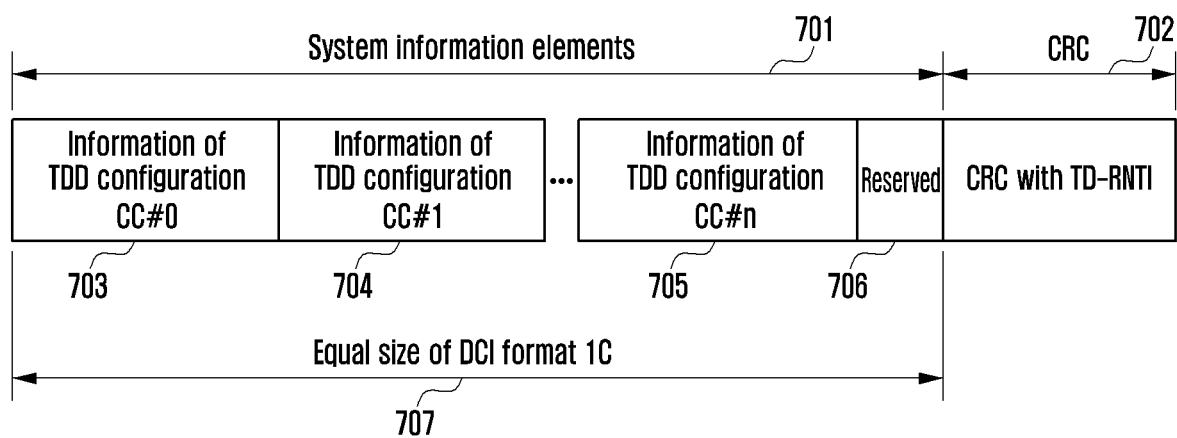
FIG. 7 illustrates a control channel format for TDD frame configuration information according to an exemplary embodiment of the present invention.

FIG. 7 illustrates a control channel format for TDD frame configuration information according to an exemplary embodiment of the present invention. Here, TDD frame configuration information for multiple cells is aggregated.

Referring to FIG. 7, a scheme in which TDD configuration changes of different cells are notified by one cell. A user equipment may use multiple carriers, which are treated as separate cells. When carriers are sufficiently separated in frequency, cells may have different TDD frame configurations and change TDD frame configurations individually. However, to allow user equipments to dynamically acquire configuration information, one cell may need to transmit configuration information of other cells. In FIG. 7, reference numeral 701 indicates a system information part, in which TDD configuration information 703 through 705 of multiple cells is linked in order of installed cells. In this case, the size of the system information part 701 should be equal to the total size of the common control channel, i.e., the size of DCI format 1C, as indicated by reference numeral 707, in the LTE system. The reserved field 706 and the CRC part 702 are formed in the same manner as in FIG. 4.

In another exemplary embodiment of the present invention, the base station may send user equipments a MAC header containing TDD frame configuration information through a data channel. During data channel scheduling, the base station may transmit a MAC header containing the information field described above, and a user equipment may identify a new TDD frame configuration or subframe direction if it successfully receives the scheduled data channel.

A MAC header containing TDD frame configuration information may be contained not only in a data channel that is sent by the base station to the user equipment but also in a data channel that is sent by the user equipment to the base station. Hence, information on the current TDD frame configuration of the user equipment may be fed back to the base station. This may complement information transmission through the common control channel, where it is difficult for the base station to determine whether the sent information is successfully received by all concerned user equipments. That is, the base station may use this scheme to ensure that all concerned user equipments use a new TDD frame configuration.

Figure 8:
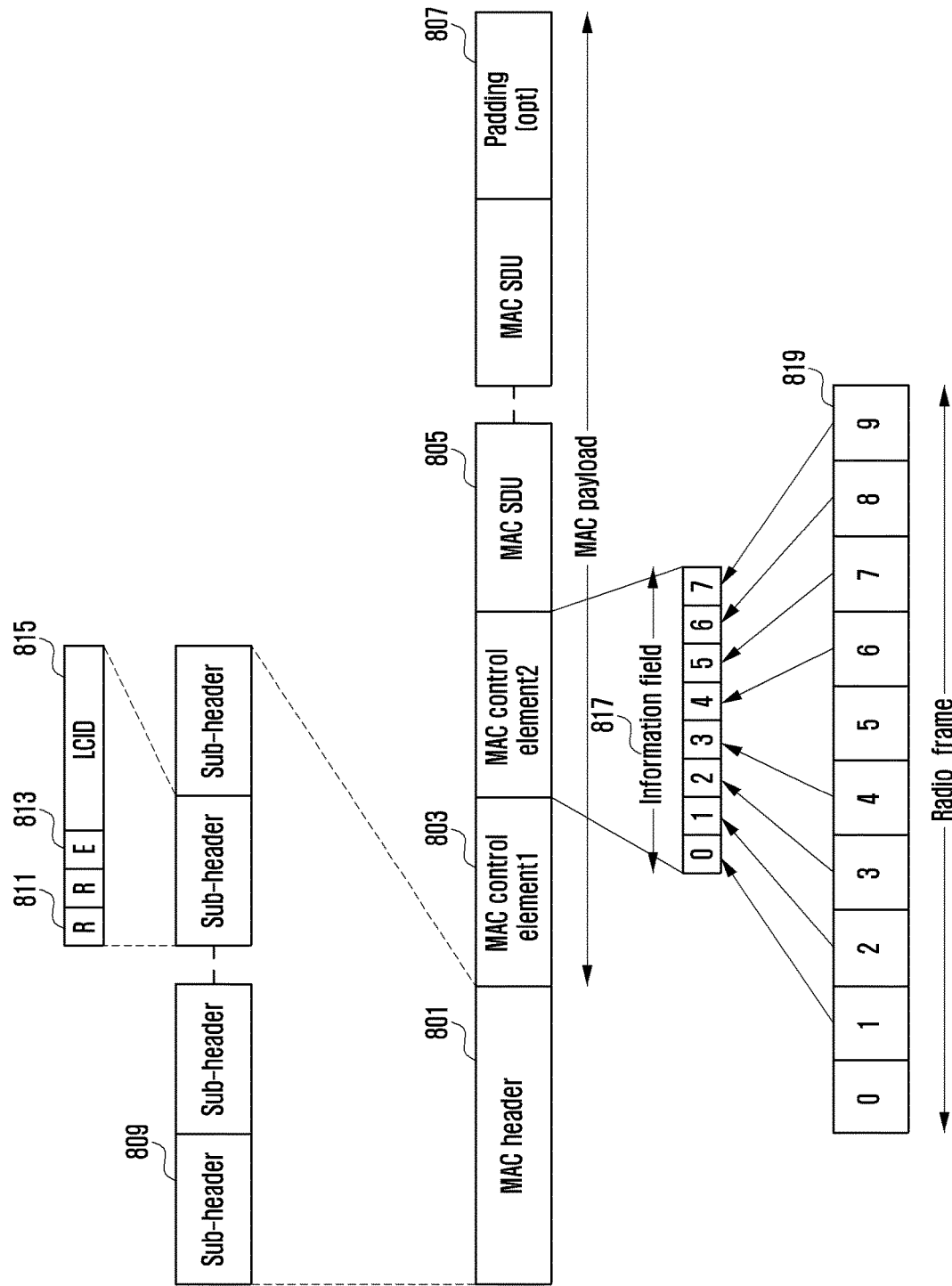
FIG. 8 illustrates a format of a MAC message used to carry TDD frame configuration information according to an exemplary embodiment of the present invention.

FIG. 8 illustrates a format of a MAC message used to carry TDD frame configuration information according to an exemplary embodiment of the present invention.

Referring to FIG. 8, the MAC message for a data channel includes a MAC header 801 at the beginning. The MAC header 801 includes multiple sub-headers 809. One sub-header 809 may have a Reserved (R) field 811, an Extension (E) field 813, and a Logical Channel Identifier (LCID) field 815 for sub-header type indication. The LCID field 815 has a size of 5 bits for uplink and downlink.

In addition to the MAC header 801, the MAC message includes MAC control elements 803 (i.e., corresponding in sequence and number to sub-headers 809 in the MAC header 801), MAC SDUs 805, and padding 807. A MAC message may contain information to be transmitted in a sub-header and associated MAC control element. Hence, TDD frame reconfiguration information may be sent to the user equipment by means of a MAC header. Table 9 below illustrates LCID values for downlink transmission. Here, LCID value "11010" is assigned to TDD reconfiguration information.

TABLE 9

| Index | LCID for Downlink Shared Channel (DL-SCH) |
|---|---|
| 00000 | Common Control Channel (CCCH) |
| 00001-01010 | Identity of the logical channel |
| 01011-11001 | Reserved |
| 11010 | TDD reconfiguration |
| 11011 | Activation/deactivation |
| 11100 | UE contention resolution identity |
| 11101 | Timing advance command |
| 11110 | Discontinuous Reception (DRX) command |
| 11111 | Padding |

When the base station requests information on the current TDD configuration of a user equipment, the user equipment may send current TDD configuration information to the base station through a MAC message. Table 10 below illustrates LCID values for uplink transmission. Here, an LCID value of "11000" is assigned to TDD configuration reporting.

TABLE 10

| Index | LCID for UL-SCH |
|---|---|
| 00000 | CCCH |
| 00001-01010 | Identity of the logical channel |
| 01011-10111 | Reserved |
| 11000 | TDD configuration Report |
| 11001 | Extended Power Headroom Report |
| 11010 | Power headroom report |
| 11011 | C-RNTI |
| 11100 | Truncated Buffer Status Report (BSR) |
| 11101 | Short BSR |
| 11110 | Long BSR |
| 11111 | Padding |

As shown in FIG. 8, a MAC control element having a size of 1 byte, as indicated by reference numeral 817, may be used for transmission of TDD frame configuration information. Such a MAC control element may contain an 8-bit information field, as indicated by reference numeral 819, indicating directions of subframes 1, 2, 3, 4, 6, 7, 8 and 9 (excluding subframes 0 and 5).

Figure 9:
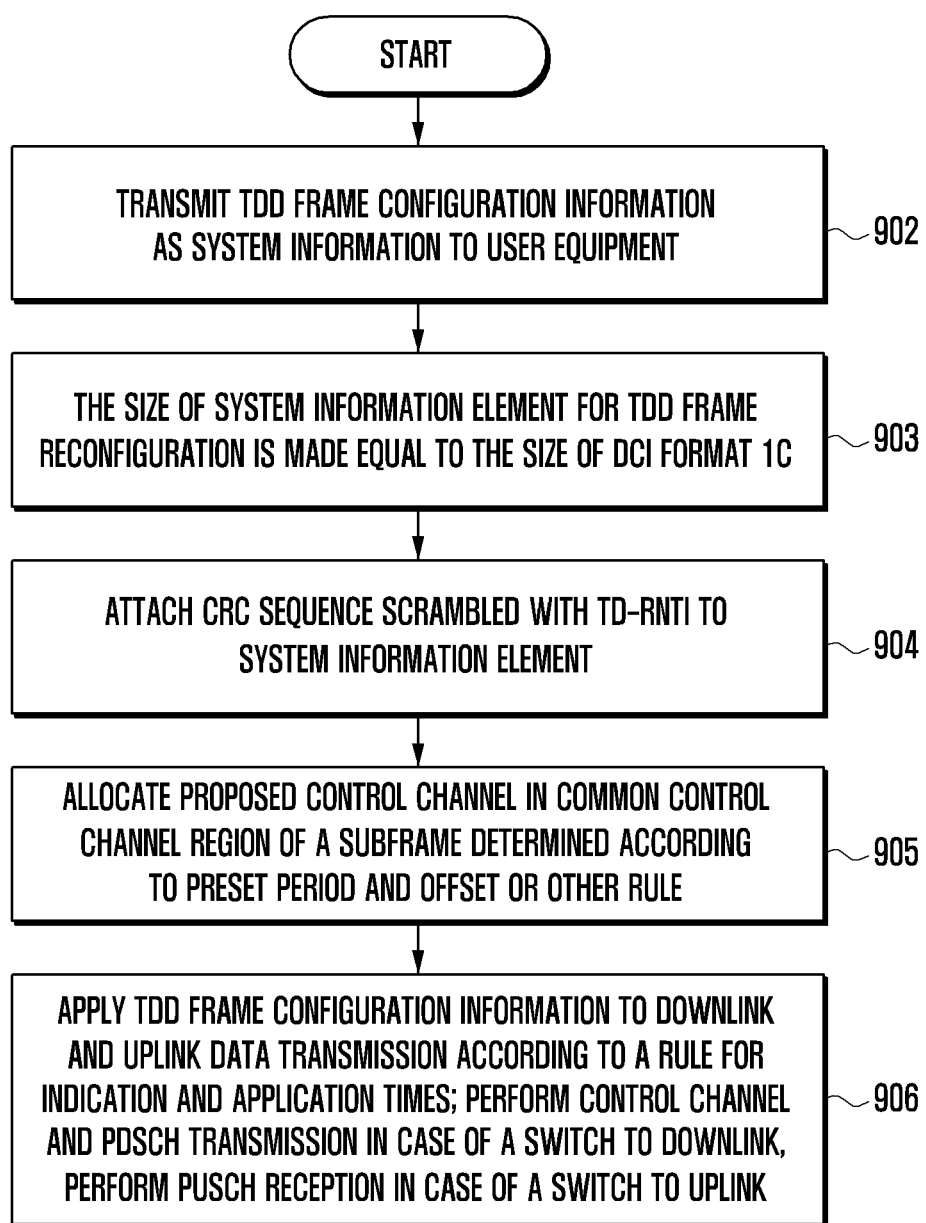
FIG. 9 is a flowchart of a transmission procedure for a base station according to an exemplary embodiment of the present invention.

FIG. 9 is a flowchart of a transmission procedure for a base station according to an exemplary embodiment of the present invention.

Referring to FIG. 9, the base station transmits TDD frame configuration information as system information to the user equipment at step 902. The base station then creates a system information element having a size equal to the size of DCI format 1C to contain TDD frame reconfiguration information at step 903. At step 904, the base station attaches a CRC sequence scrambled with TD-RNTI to the system information element. The base station transmits the system information element together with the CRC sequence by allocating the proposed control channel in the common control channel region of a subframe determined according to a preset period and offset or other rule at step 905. The base station performs subframe direction switching in consideration of a timing relationship between the reconfiguration indication and application thereof, schedules downlink transmission and uplink transmission according to subframe direction switching, delivers the scheduling information to the user equipment, and performs data channel transmission and reception to and from the user equipment at step 906.

In other words, the base station determines a TDD frame configuration. Here, the base station determines directions of dynamic subframes in the TDD frame according to traffic conditions. The base station generates system information based on the TDD frame configuration information. Here, the size of the system information is made equal to the size of DCI format 1C by adding a suitable number of reserved bits. The base station attaches a CRC sequence scrambled with TD-RNTI to the system information. If needed, TDD frame configuration information of multiple carriers can be aggregated into the system information. The base station transmits the system information by inserting the system information into the common control channel. Thereafter, the base station communicates with user equipments according to the updated TDD frame configuration.

Figure 10:
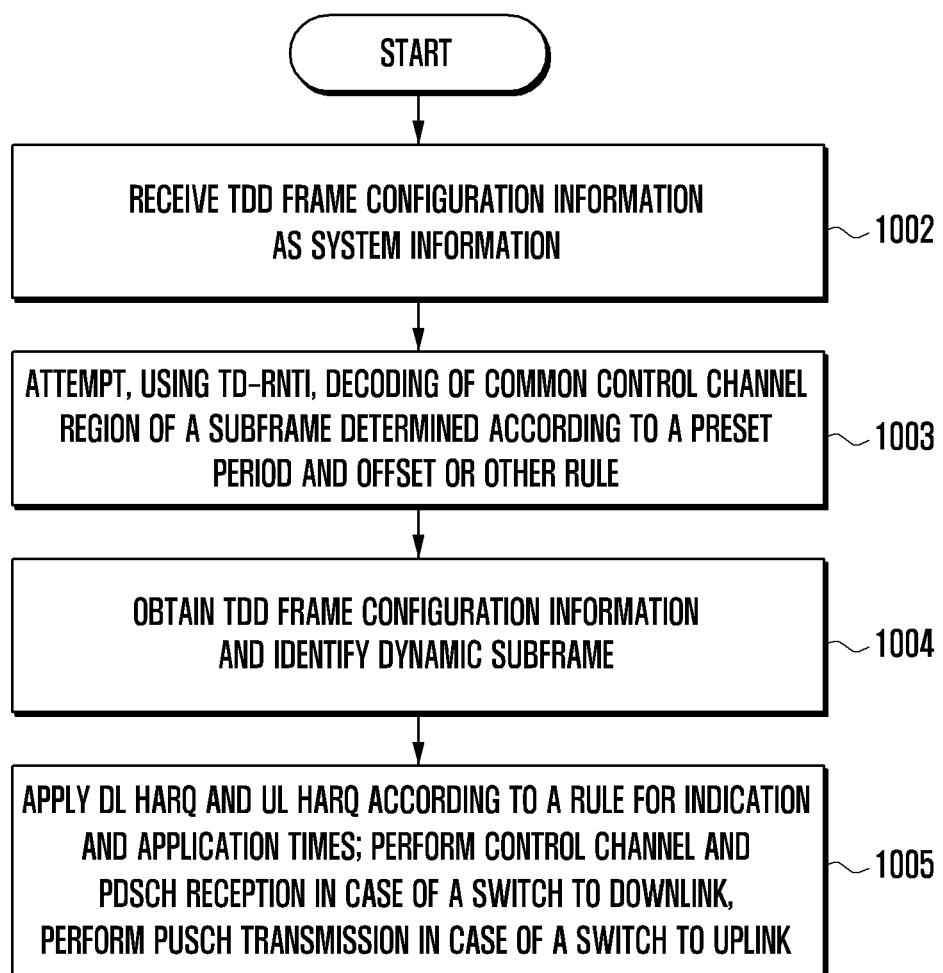
FIG. 10 is a flowchart of a reception procedure for a user equipment according to an exemplary embodiment of the present invention.

FIG. 10 is a flowchart of a reception procedure for a user equipment according to an exemplary embodiment of the present invention.

Referring to FIG. 10, the user equipment receives TDD frame configuration information as system information from the corresponding base station at step 1002. To achieve this, the user equipment attempts blind decoding, using TD-RNTI, in the common control channel region of a subframe determined according to a preset period and offset or other rule at step 1003. The user equipment identifies TDD frame configuration information from successfully decoded data at step 1004. The user equipment performs control and data channel reception or performs uplink data channel transmission in consideration of the indication time and application time of the configuration information at step 1005.

In other words, the user equipment receives system information on the common control channel. To achieve this, the user equipment performs blind decoding on the common control channel using TD-RNTI defined for TDD configuration system information. Here, the size of the system information is equal to that of DCI format 1C, and TDD frame configuration information of multiple carriers can be aggregated into the system information. The user equipment identifies a TDD frame configuration through analysis of the system information. The user equipment determines transmission directions of dynamic subframes in the TDD frame. The user equipment communicates with the base station according to the updated TDD frame configuration. Here, the dynamic subframes are used according to their transmission directions.

Figure 11:
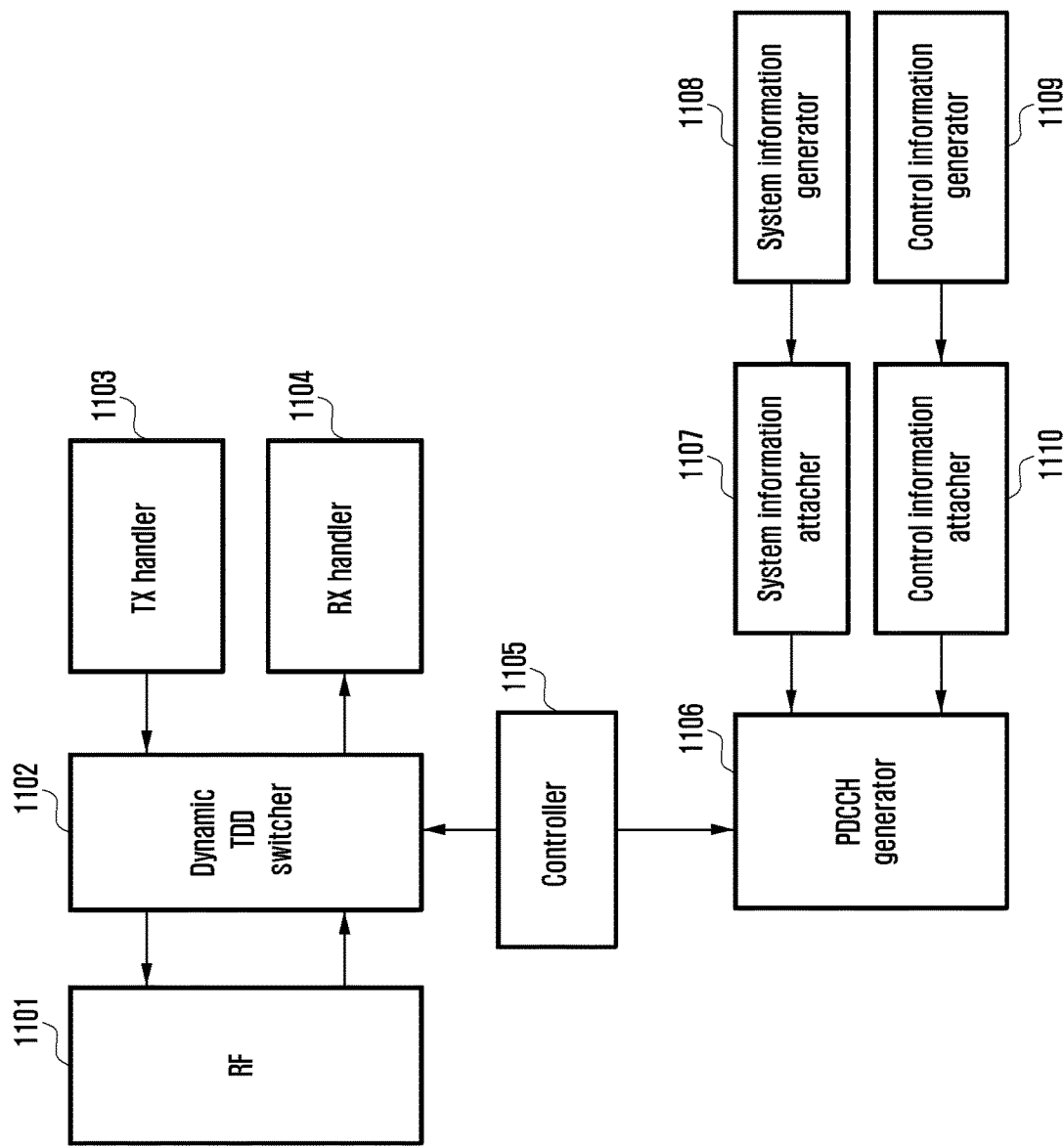
FIG. 11 is a block diagram of a base station according to an exemplary embodiment of the present invention.

FIG. 11 is a block diagram of a base station according to an exemplary embodiment of the present invention.

Referring to FIG. 11, the base station includes a TDD Radio Frequency (RF) unit 1101, a dynamic TDD switcher 1102, a transmission handler 1103, a reception handler 1104, a controller 1105, a control channel generator 1106, a system information attacher 1107, a system information generator 1108, a control information generator 1109, and a control information attacher 1110.

The TDD RF unit 1101 performs radio communication for the base station. The TDD RF unit 1101 performs downlink transmission or uplink reception. The dynamic TDD switcher 1102 controls the TDD RF unit 1101 to switch between uplink operations and downlink operations according to preset scheduling times. The transmission handler 1103 processes a signal to be transmitted through downlink transmission. The reception handler 1104 processes a signal received through uplink reception. The controller 1105 determines a TDD frame configuration. Here, the controller 1105 determines transmission directions (i.e., uplink or downlink) of dynamic subframes. The controller 1105 controls radio communication according to the TDD frame configuration. Here, the controller 1105 determines whether to switch transmission directions of dynamic subframes in the TDD frame, and controls transmission direction switching of the dynamic subframes.

The system information generator 1108 generates system information using TDD frame configuration information. Here, the size of the system information is made equal to that of DCI format 1C. The system information generator 1108 may generate system information by aggregating TDD frame configuration information of multiple carriers. The system information attacher 1107 attaches a CRC sequence scrambled with TD-RNTI to the system information. The control information generator 1109 generates DCI. The control information attacher 1110 attaches a CRC sequence scrambled with RNTI to the downlink control information. The control channel generator 1106 generates a control channel using system information and downlink control information. That is, the control channel generator 1106 sends system information and downlink control information by inserting the same into the common control channel.

Figure 12:
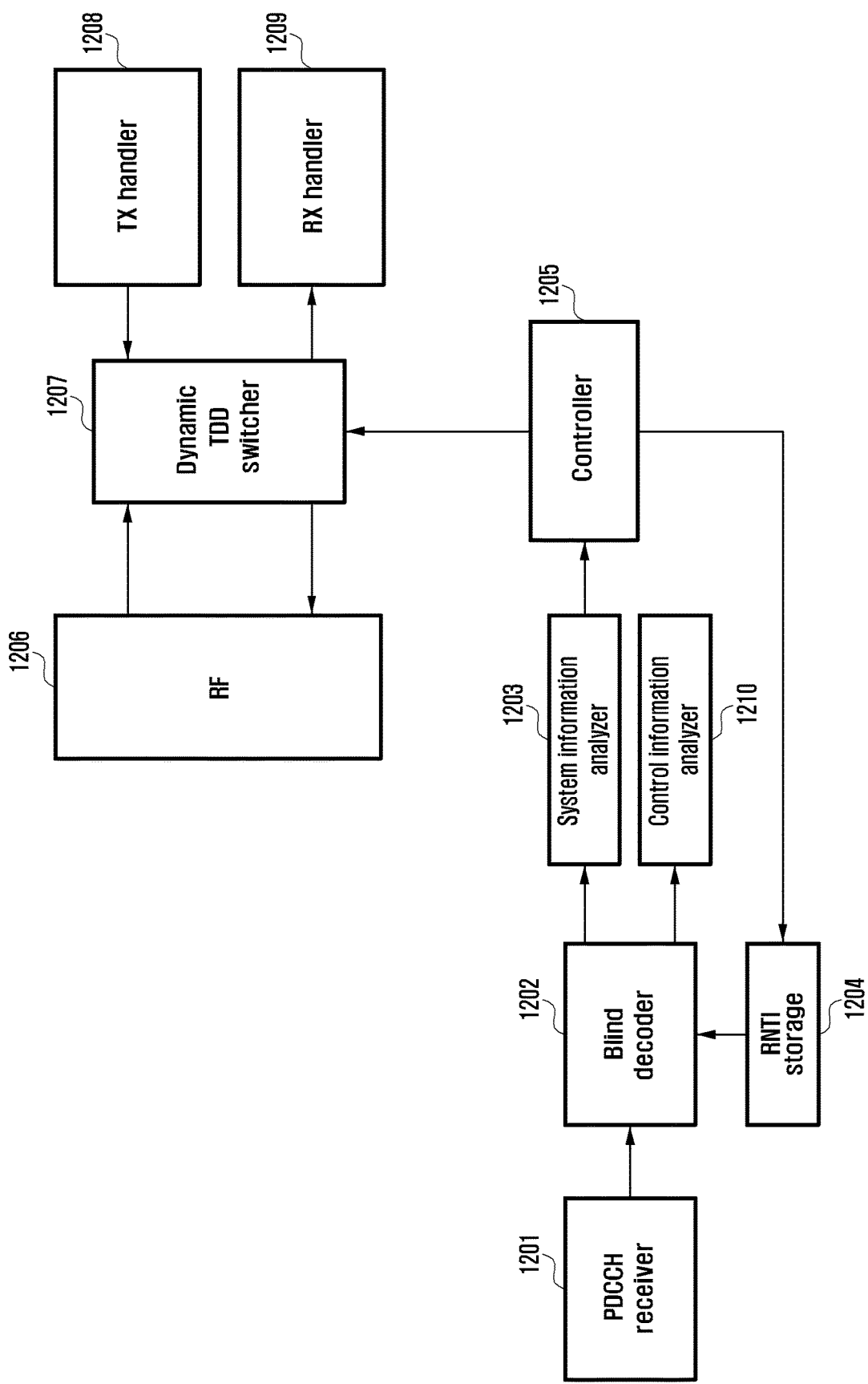
FIG. 12 is a block diagram of a user equipment according to an exemplary embodiment of the present invention.

FIG. 12 is a block diagram of a user equipment according to an exemplary embodiment of the present invention.

Referring to FIG. 12, the user equipment includes a control channel receiver 1201, a blind decoder 1202, a system information analyzer 1203, a control information analyzer 1210, an RNTI storage 1204, a controller 1205, a TDD RF unit 1206, a dynamic TDD switcher 1207, a transmission handler 1208, and a reception handler 1209.

The TDD RF unit 1206 performs radio communication for the user equipment. That is, the TDD RF unit 1206 performs downlink reception or uplink transmission. The dynamic TDD switcher 1207 controls the TDD RF unit 1206 to switch between uplink operations and downlink operations according to preset scheduling times. The transmission handler 1208 processes a signal to be transmitted through uplink transmission. The reception handler 1209 processes a signal received through downlink reception. The controller 1205 determines whether to switch transmission directions (i.e., uplink or downlink) of dynamic subframes in the TDD frame based on TDD frame configuration information. The controller 1205 controls radio communication according to the TDD frame configuration, and controls transmission direction switching of dynamic subframes in the TDD frame.

The control channel receiver 1201 performs control channel reception. The blind decoder 1202 receives the common control channel and UE-specific control channel through blind decoding of the control channel using RNTIs. The blind decoder 1202 receives system information on the common control channel using TD-RNTI, and receives downlink control information on the common control channel using other RNTIs. Here, the system information and downlink control information have the same size. The RNTI storage 1204 stores various types of RNTIs. The system information analyzer 1203 analyzes system information to identify a TDD frame configuration, and determines transmission directions (i.e., uplink or downlink) of dynamic subframes. The control information analyzer 1210 analyzes downlink control information to identify scheduling information.

In an exemplary embodiment of the present invention, the method and apparatus for transmitting and receiving TDD frame configuration information enable the base station to send TDD frame configuration information as system information through the common control channel. Accordingly, the base station may dynamically change the TDD frame configuration according to changes in uplink and downlink traffic conditions. In addition, it is possible to prevent interference between uplink transmission of the user equipment and downlink transmission of the base station.

While the invention has been described with reference to certain exemplary embodiments thereof, it will be understood by those skilled in the art that various changes in form and detail may be made therein without departing from the spirit and scope of the present invention as defined in the appended claims and their equivalents.

What is claimed is:

1. A method performed by a base station in a wireless communication system employing a time division duplex (TDD) mode, the method comprising:

transmitting, by the base station in the wireless communication system employing the TDD mode, to a terminal, system information including information on a TDD configuration associated with an uplink timing and a downlink timing;

identifying, by the base station, a specific radio network temporary identifier (RNTI) for the TDD configuration;

generating, by the base station, downlink control information (DCI) including an index indicating the TDD configuration; and transmitting, by the base station, to the terminal on a common control channel, the DCI with a cyclic redundancy check (CRC) sequence scrambled by the specific RNTI, the DCI being transmitted based on a period and an offset.

2. The method of claim 1, wherein a structure among a plurality of structures associated with the TDD configuration is indicated by the index included in the DCI.

3. The method of claim 2, wherein, in case that a plurality of cells are configured, the DCI includes a plurality of indices indicating the TDD configuration and each index of the plurality of indices corresponds to each cell respectively.

4. The method of claim 1, wherein a size of the DCI is adjusted to a specific size.

5. The method of claim 1, wherein the system information is transmitted on a data channel.

6. A base station in a wireless communication system employing a time division duplex (TDD) mode, the base station comprising:
a transceiver; and
a controller configured to:
transmit, to a terminal via the transceiver, system information including information on a TDD configuration associated with an uplink timing and a downlink timing,
identify a specific radio network temporary identifier (RNTI) for the TDD configuration,
generate downlink control information (DCI) including an index indicating the TDD configuration, and
transmit, to the terminal via the transceiver on a common control channel, the DCI with a cyclic redundancy check (CRC) sequence scrambled by the specific RNTI, the DCI being transmitted based on a period and an offset.

7. The base station of claim 6, wherein a structure among a plurality of structures associated with the TDD configuration is indicated by the index included in the DCI.

8. The base station of claim 7, wherein, in case that a plurality of cells are configured, the DCI includes a plurality of indices indicating the TDD configuration and each index of the plurality of indices corresponds to each cell respectively.

9. The base station of claim 6, wherein a size of the DCI is adjusted to a specific size.

10. The base station of claim 6, wherein the system information is transmitted on a data channel.

11. A method performed by a terminal in a wireless communication system employing a time division duplex (TDD) mode, the method comprising:
receiving, by the terminal in the wireless communication system employing the TDD mode, from a base station, system information including information on a TDD configuration associated with an uplink timing and a downlink timing;
identifying, by the terminal, a specific radio network temporary identifier (RNTI) for the TDD configuration;
monitoring, by the terminal, on a common control channel, downlink control information (DCI) with a cyclic redundancy check (CRC) sequence scrambled by the specific RNTI, the DCI including an index indicating the TDD configuration, the DCI being monitored based on a period and an offset; and
identifying, by the terminal, the uplink timing and the downlink timing based on the index indicating the TDD configuration.

12. The method of claim 11, wherein a structure among a plurality of structures associated with the TDD configuration is indicated by the index included in the DCI.

13. The method of claim 12, wherein, in case that a plurality of cells are configured, the DCI includes a plurality of indices indicating the TDD configuration and each index of the plurality of indices corresponds to each cell respectively.

14. The method of claim 11, wherein a size of the DCI is adjusted to a specific size.

15. The method of claim 11, wherein the system information is received on a data channel.

16. A terminal in a wireless communication system employing a time division duplex (TDD) mode, the terminal comprising:
a transceiver; and
a controller configured to:
receive, from a base station via the transceiver, system information including information on a TDD configuration associated with an uplink timing and a downlink timing,
identify a specific radio network temporary identifier (RNTI) for the TDD configuration,
monitor, on a common control channel, downlink control information (DCI) with a cyclic redundancy check (CRC) sequence scrambled by the specific RNTI, the DCI including an index indicating the TDD configuration, the DCI being monitored based on a period and an offset, and
identify the uplink timing and the downlink timing based on the index indicating the TDD configuration.

17. The terminal of claim 16, wherein a structure among a plurality of structures associated with the TDD configuration is indicated by the index included in the DCI.

18. The terminal of claim 17, wherein, in case that a plurality of cells are configured, the DCI includes a plurality of indices indicating the TDD configuration and each index of the plurality of indices corresponds to each cell respectively.

19. The terminal of claim 16, wherein a size of the DCI is adjusted to a specific size.

20. The terminal of claim 16, wherein the system information is received on a data channel.

* * * * *